United States Patent [19]

Cleasby

[11] Patent Number: 4,785,839
[45] Date of Patent: Nov. 22, 1988

[54] PILOT VALVES FOR TWO-STAGE HYDRAULIC DEVICES

[75] Inventor: Kenneth G. Cleasby, Cobham, England

[73] Assignee: Vickers Systems Limited, Havant, England

[21] Appl. No.: 85,637

[22] Filed: Aug. 13, 1987

Related U.S. Application Data

[62] Division of Ser. No. 903,401, Sep. 3, 1986, Pat. No. 4,719,944.

[30] Foreign Application Priority Data

Oct. 26, 1985 [GB] United Kingdom ............... 8526442

[51] Int. Cl.$^4$ ............................................. F15B 13/043
[52] U.S. Cl. ..................................... 137/1; 137/625.64
[58] Field of Search .................. 137/1, 625.65, 625.64

[56] References Cited

U.S. PATENT DOCUMENTS 4,615,358 10/1986 Hammond et al. .......... 137/625.65 X

Primary Examiner—Gerald A. Michalsky
Attorney, Agent, or Firm—Barnes, Kisselle, Raisch, Choate, Whittemore & Hulbert

[57] ABSTRACT

A pilot valve for a two-stage hydraulic device, the pilot wave comprising a spool slidably mounted in a housing for movement in opposite directions from a normal null position in order to deliver fluid under pressure from an inlet port through one or other of two service ports to a second stage of the device to actuate the latter in one direction or an opposite direction from a normal null position, and an electrically-actuated spool control device, associated with one end of the spool. The pilot valve spool is movable beyond its normal operating range to an offset zero flow position in the event of a failure of a control device. A spring is disposed at one end of the pilot valve spool and is operable, in the event of failure of a control device, to move the spool to a predetermined position. A stop for the spring prevents further movement of the spool beyond the predetermined position. The pilot valve is constructed to allow pressure fluid to react on the pilot valve spool so that when the spring engages the stop, this reaction results in movement of the spool to move the spool fully to the dump position in which both service ports are connected to tank, flow of fluid under pressure is metered from the inlet port through the service port, which would otherwise be subjected to such flow in such offset position of the pilot spool.

4 Claims, 6 Drawing Sheets

{·}

PILOT VALVES FOR TWO-STAGE HYDRAULIC DEVICES

This is a divisional of co-pending application Ser. No. 903,401 filed on Sept. 3, 1986, now U.S. Pat. No. 4,719,944.

BACKGROUND OF THE INVENTION

1. Field of the Invention

This invention relates to pilot valves for two-stage hydraulic devices and more particularly, although not exclusively, to two-stage proportional hydraulic valves.

2. Description of the Prior Art

One basic problem with known two-stage proportional valves is that the main stage does not always return to null with sufficient speed to avoid a potentially hazardous condition when the electrical supply to the pilot valve is interrupted. This is because the spool of the main stage, assuming it is offset and not in the normal central (null) position when the emergency arises, has to force hydraulic fluid from the pressurised control chamber thereof, through the underlapped metering areas of the pilot valve and thence to tank or reservoir. The underlapped metering areas are, by design, kept small to give good performance under normal operating conditions and this, coupled with the fact that the force of the centring springs for the main stage spool produce a relatively low pressure differential across the underlapped metering areas of the pilot valve spool, means that centring of the main stage spool can take several seconds. If, as a result of the emergency, the main stage has been placed in a hardover position, then serious damage can be caused to the machinery and/or workpiece being controlled by the valve if corrective action is not taken quickly.

It is thus necessary to provide an alternative flow path to discharge the control pressures to tank in the event of an emergency so that fluid under pressure in the main stage can be relieved quickly, whereby the main stage will be nulled or centred quickly.

Solutions to the problem under discussion have been proposed and these have included the provision of an auxiliary dump valve, the provision of an additional spring offset dump position on the pilot spool, and the provision of a spring-separated, split spool which increases metering area size to provide the desired alternative flow path so as to effect rapid release of hydraulic fluid from the main stage control chambers. These previous proposals all have disadvantages: the dump valve involves extra cost and space, and the split spool whilst effective is a little sophisticated and is thus too expensive for inclusion in more basic, cheaper valves.

In U.S. Pat. No. 4,615,358 there is disclosed another solution to the problem in which the spool of a solenoid-operated pilot valve is formed with two passageways each extending internally of the spool between respective end faces of the latter and the periphery of the spool. In normal operation of the valve, the pilot valve control devices seat against the end faces of the spool so as to close the passageways against fluid flow therethrough, the control devices becoming unseated in the event of an interruption in the electrical input to the or each solenoid, whereby both ends of the second stage are at a common pressure so as quickly to relieve the pressure in the second stage of the device, thereby permitting fast return of the latter to the null position. This arrangement has been found to achieve rapid relief of hydraulic fluid from the main stage to allow fast nulling of the latter in a very simple and cost-effective manner but has also been found to suffer the disadvantagve that excessive and constant flow from the pressure port to one or other service port, and thence to tank, via the passageways in the spool can take place if the pilot spool does not centre accurately.

SUMMARY OF THE INVENTION

According to the present invention there is provided a pilot valve for a two-stage hydraulic device, the pilot valve comprising a spool slidably mounted in a housing for movement in opposite directions from a normal null position in order to deliver fluid under pressure from an inlet port through one or other of two service ports to the second stage of the device to actuate the latter in one direction or an opposite direction from a normal null position, and at least one electrically-actuated spool control device, associated with one or respective ends of the spool, the pilot valve spool being movable beyond its normal operating range to an offset, zero flow position in the event of a failure of the or each control device, characterised in that the pilot valve spool comprises additional metering means, and in that the pilot valve further comprises resilient means disposed at one end of the pilot valve spool and operable, in the event of said failure, to move the spool to a predetermined position, stop means for the resilient means operable to prevent further movement of the spool by the resilient means beyond said predetermined position, and means for allowing pressure fluid to react on the pilot valve spool so that when the resilient means engage the stop means, this reaction results in movement of the spool to the final offset position in which both service ports are connected to tank, with the additional metering means inhibiting flow of fluid under pressure from the inlet port through the service port which would otherwise be subjected to such flow in this offset position of the pilot spool.

In the offset position, one service port is fully connected to tank which allows fast nulling of the main spool from one offset direction, while nulling from the other offset direction requires discharge of the fluid from the service port which is blocked by the additional metering means which inhibits flow from the pilot/supply port. The means for discharging the fluid from this main spool control chamber may comprise an internal passageway through the spool extending from the blocked service port to one end of the spool, and closure means operable to close the passageway at all times except when the resilient means engage the stop means or failure occurs in the resilient means, whereupon the passageway is opened by fluid pressure disengaging the closure means and/or fluid pressure acting on the spool to move the latter whereby fluid can discharge to tank.

The closure means may be in the form of a poppet valve which is normally urged to the closed position by the resilient means which is conveniently in the form of a compression spring acting also as one of the control devices for the pilot valve.

Alternatively, the internal passageway may extend to the end of the spool opposite to that on which the resilient means acts, at which end the electrically-actuated control device acts, the passageway normally being closed by a component of the control device such as the push rod in the case of a solenoid.

According to another aspect of the present invention there is provided a method of controlling an electrically-operated pilot spool valve the spool of which is arranged to be movable to an offset position in which both service ports of the valve are connected to tank in the event of a failure in the electrical supply to the or each electrically-actuated control device, characterised in that the method comprises the steps of moving the spool to the offset position in two stages, firstly by resilient means acting on one end of the spool and operable to move the latter an initial predetermined distance before engaging stop means, and secondly by fluid pressure to complete movement of the spool to the offset position.

Préssure fluid used to complete the movement of the spool to the offset position may come from an external supply or, as above, be the pressure fluid in the main spool control chamber.

BRIEF DESCRIPTION OF THE DRAWINGS

Pilot valves for two-stage hydraulic devices in accordance with the present invention will now be described in greater detail, by way of example, with reference to the accompanying drawings, in which FIGS. 1 to 6 respectively show partial diagrammatic cross-sections of six different embodiments of pilot valve.

DESCRIPTION OF THE PREFERRED EMBODIMENT

Figure 1:
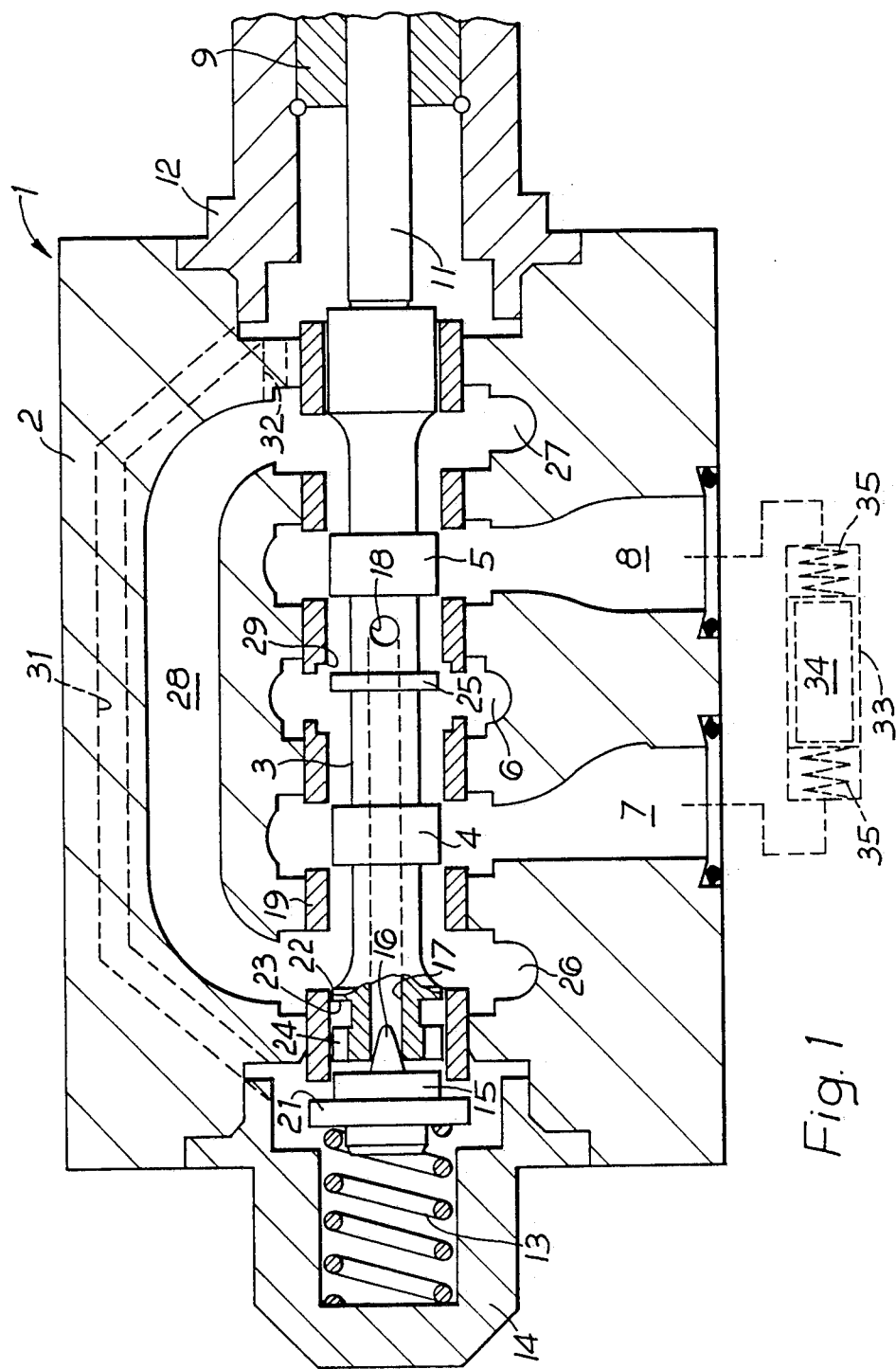

Referring first to FIG. 1, this shows a pilot valve 1 comprising a housing 2 within which a spool 3 is slidably mounted to control, via lands 4 and 5, the flow of pressure fluid from an inlet or pressure port 6 to one or other of two service ports 7 and 8. The position of the spool 3 is controlled at one end by a solenoid 9 (only partially shown), the push pin or rod 11 of which acts on one end of the spool in a conventional manner, the solenoid, of which the core tube 12 is a part, being mounted on the housing 2. At the opposite end, the spool 3 is acted upon by a compression spring 13 contained within an end cap 14 on the housing 2. The spring 13 acts on the spool 3 via a poppet valve member 15, a tapered stem 16 of which normally engages and closes one end of a passageway 17 which terminates in the end face of the spool and extends axially of the spool to a position short of the opposite end, terminating here in a diametrically-extending portion 18 which opens to the periphery of the spool between the two land 4 and 5.

Basically, the poppet valve member 15 slides within a sleeve 19 in the housing 2, as does the spool 3, but it is provided with an annular flange 21 which is engageable with the adjacent end of the sleeve 19 which thus provides a stop for the poppet valve member. The end 22 of the spool 3 is provided with an annular groove 23 inset from the end of the spool but communicating therewith via four equiangularly spaced, axially-extending slots or drillings 24.

An additional land 25 (providing additional metering means) is provided between the lands 4 and 5, with the portion 18 of the passageway terminating between the lands 5 and 25, i.e. in a position in which it can communicate with a control chamber of the main stage.

FIG. 1 shows the valve in the null or centred position in which the lands 4 and 5 respectively close the service ports 7 and 8 so that flow of pressure fluid therethrough from the inlet port 6 is prevented, ignoring any underlapping. Equally, the lands 4 and 5 block communication of the service ports 7 and 8 with respective tank ports 26 and 27 which are interconnected internally by a gallery 28. The two end chambers of the pilot valve are interconnected by an internal gallery 31, with a drilling 32 interconnecting the right-hand chamber to the tank gallery 28.

In this position of the valve, the additional land 25 is spaced from a metering edge 29 of the sleeve 19 and is thus ineffective, and the poppet valve member 15 has its flange 21 spaced from the stop formed by the end of the sleeve 19, whereby the poppet valve is fully closed by the spring 13 and flow of fluid through the passageway 17, 18 cannot take place. Centring of the spool 3 takes place by virtue of a balanced condition between the solenoid 9 and the compression spring 13.

However, should the electrical supply to the solenoid 9 be interrupted, the push pin 11 thereof is no longer subjected to a force urging it into engagement with the adjacent end face of the spool 3, whereby the spring 13 takes over completely and moves the spool to the right (as seen in FIG. 1) to a predetermined position defined by engagement of the flange 21 with the end of the sleeve 19, whereupon the spring is rendered inoperative as regards further movement to the right of the spool 3. At this point the fluid in the passageway 17, 18 which is always acting upon the poppet valve member 15, 16 is now able to open that valve member as it no longer has to overcome the valve closing force of the spring 13, the resulting admission of fluid to the left-hand end of the spool 3 serving to move the latter still further to the right to complete movement of the spool to the offset position in which both service ports 7 and 8 are connected to tank. Thus there is no flow of pressure fluid to the second or main stage of the valve which is shown in broken lines (and not to scale) at 33 in FIG. 1, the spool 34 thereof being centred by normal centring springs 35, thus avoiding the possibility of any hardover position of the main stage either being maintained or effected on failure of the electrical supply to the pilot valve 1.

The additional land 25 is arranged to cooperate with the metering edge 29 just before the poppet valve 15 is allowed to open, thus blocking any flow of pressure fluid to the service port 5 which would otherwise take place.

Figure 2:
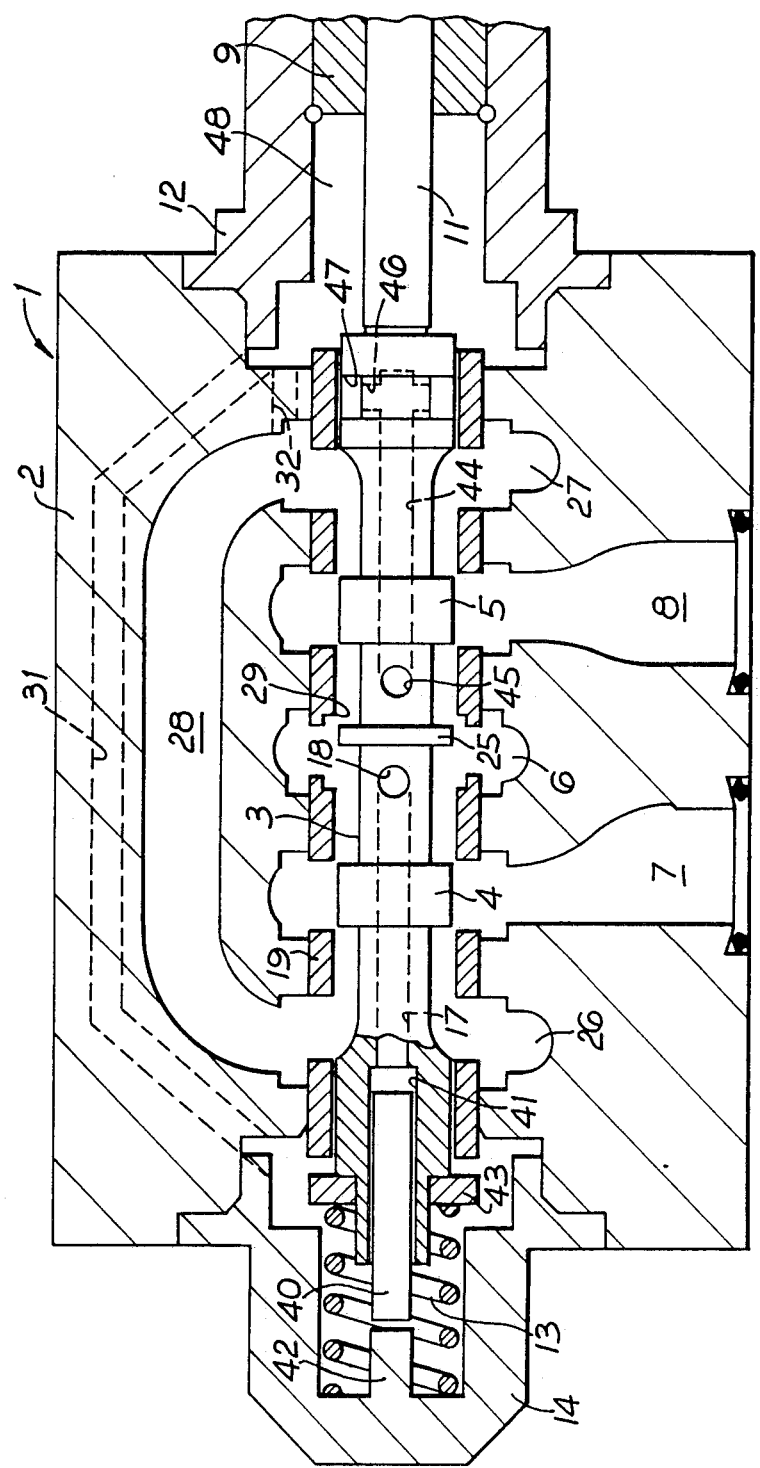

Turning now to FIG. 2, this shows an embodiment generally similar to that of FIG. 1 and like components have been given similar reference numerals. In this embodiment, the poppet valve member is replaced by a pin 40 which is free to float between the inner end of a counterbore 41 in the spool 3 and an axial projection 42 on the interior of the end cap 14. The outer end of the spool 3 has a portion of reduced diameter which receives one end of the spring 13 and also receives a washer 43 which replaces the flange 21 of the FIG. 1 embodiment. Another difference is that the spool 3 has a second passageway comprising an axially-extending portion 44 which terminates at one end in a diametrically-extending portion 45 opening to the periphery of the spool, and which terminates at the other end in a further diametrically-extending portion 46 which opens into an annular groove 47 provided in the right-hand end of the spool as seen in FIG. 2. It will be noted that in this embodiment, the diametrically-extending portion 18 of the passageway 17, 18 is disposed between the land 4 and the additional land 25, with the diametrically-extending portion 45 being disposed between the land 5 and the additional land 25.

The operation of the valve of FIG. 2 in the normal control of fluid flow to one or other of the service ports 4 and 5 is similar to that of the FIG. 1 embodiment, the presence of pressure fluid in the passageways 17, 18 and 44, 45, 46 having no effect. However, if the electrical supply to the solenoid 9 fails, the solenoid push pin 11 is freed, as before, and the spring 13 thus moves the spool to the right until the washer 43 engages the end of the sleeve 19 to render the spring inoperative. At this point, the continued reaction of the pressure fluid on the inner end of the counterbore 41 now has effect since it is no longer opposed by the solenoid, whereby the spool is moved further to the right to the dump position in which the annular groove 47 in the right-hand end of the spool communicates with the end chamber 48 and thus with tank through the internal drilling 32. Again the additional land 25 cooperates with the metering edge 29 just before the spring 13 is rendered inoperative.

An alternative arrangement to that of FIG. 2 is to dispense with the gallery 31 and with the pin 40. With no pin 40, pressure fluid acts permanently on the left-hand end of the spool 3 and will also act on the right-hand end as long as the additional land 25 does not engage the metering edge 29 so that the overall effect is nil. However, when the spring 13 moves the spool to the predetermined position in which the land 25 cooperates with the metering edge 29, then pressure fluid will only act on the left-hand end of the spool (bearing in mind there is no gallery 31), thus serving to move the spool fully to the offset position in which both service ports 7 and 8 are connected to tank.

Figure 3:
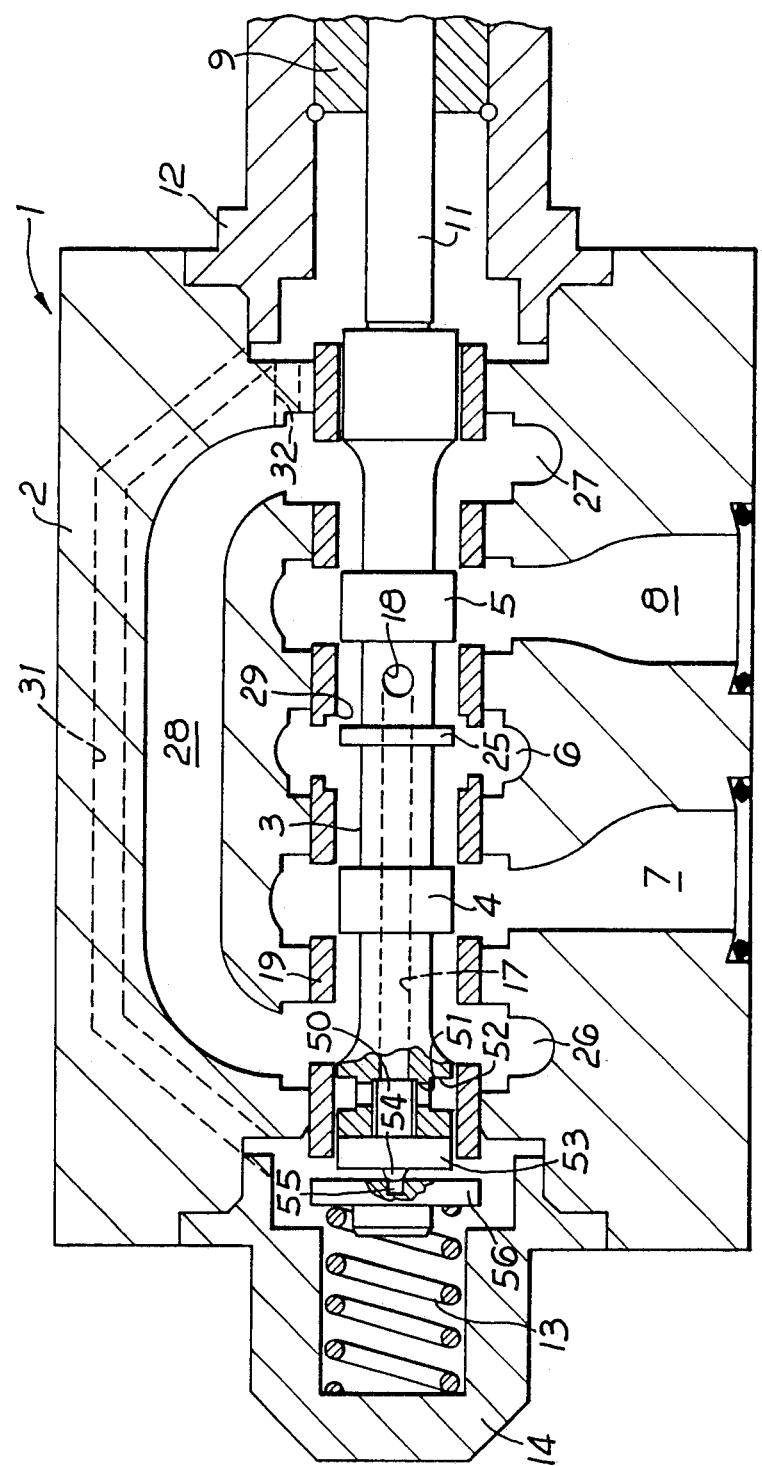

The embodiment of FIG. 3 also has like components identified with similar reference numerals, with the general valve arrangement and operation being similar to that of FIG. 1. However, the axially-extending portion 17 of the passageway 17, 18 in this embodiment is counterbored at the end face of the spool 3 to receive a poppet valve 50 and is provided, short of the spool end face, with a diametrically-extending portion 51 which opens into an annular groove 52 inset from the end of the spool 3.

The tapered poppet valve member 15 of the embodiment of FIG. 1 is replaced by the poppet 50 which is more in the form of a plug which is slidingly received in the counterbored end of the passageway portion 17 and seats against the step in the passageway produced by the counterbore. The valve 50 has a head 53 provided with a part-spherical pip 54 (which may be provided by a ball pressed into the head) which seats in a blind drilling 55 in a flange 56 and serves to spread the spring loading on the poppet valve.

If the electrical supply to the solenoid 9 fails, the spring 13 moves the spool 3 to the right, as before, until it is rendered inoperative by the engagement of the flange 56 with the end of the sleeve 19, just before which position the additional land 25 cooperates with the metering edge 29, again as before. The fluid in the service port 8 continues to act on the extreme left-hand end of the spool 3 reacting against the end of the poppet 50 which causes the spool to move further to the right thus allowing fluid to flow from the passage 17 through the groove 52 and thence to the tank gallery 26, thus connecting the passageway 17, 18, 51, and hence service port 5, to tank.

Figure 4:
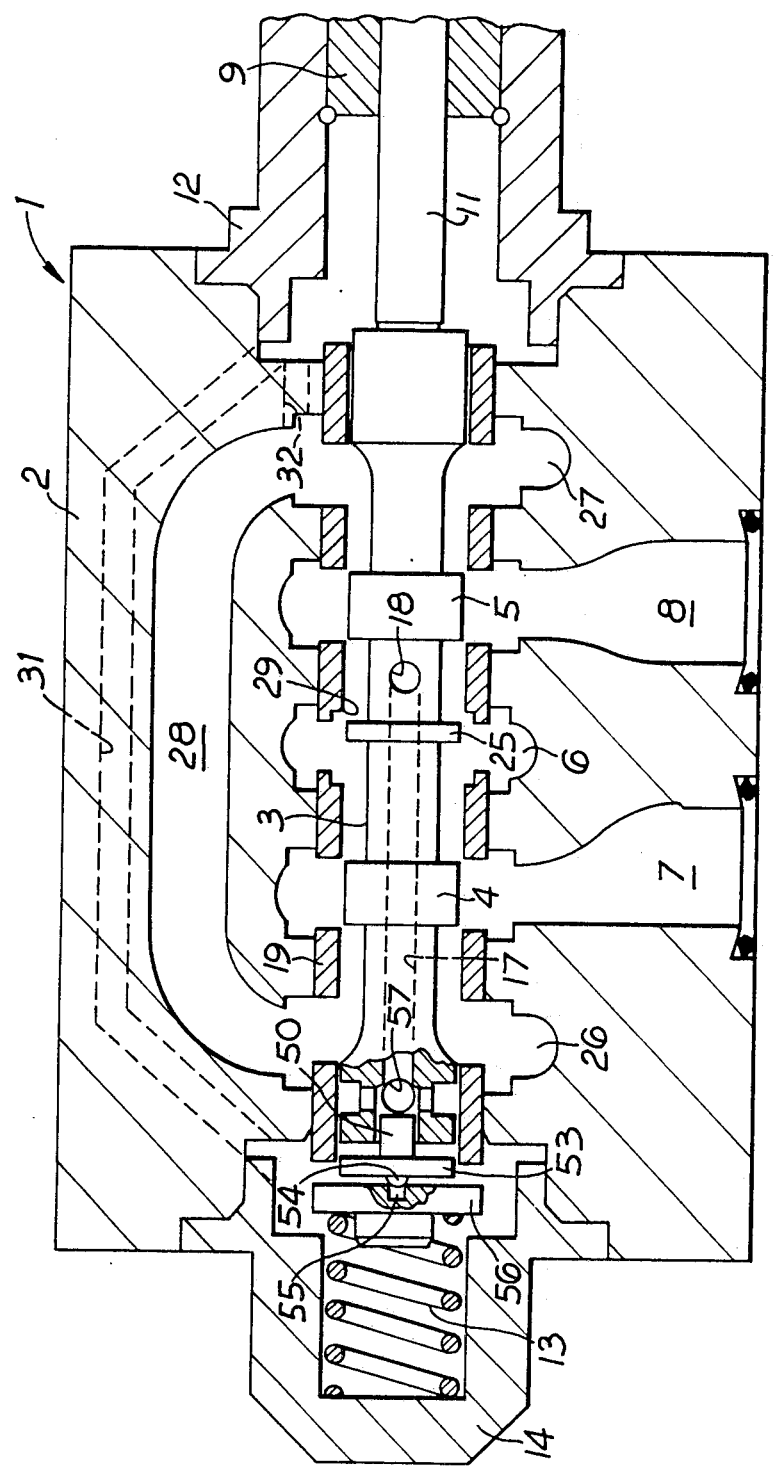

The embodiment of FIG. 4 is identical to that of FIG. 3, the only difference being that a ball 57 is used to close the passageway 17 instead of the end of the stem of the poppet valve 50.

Figure 5:
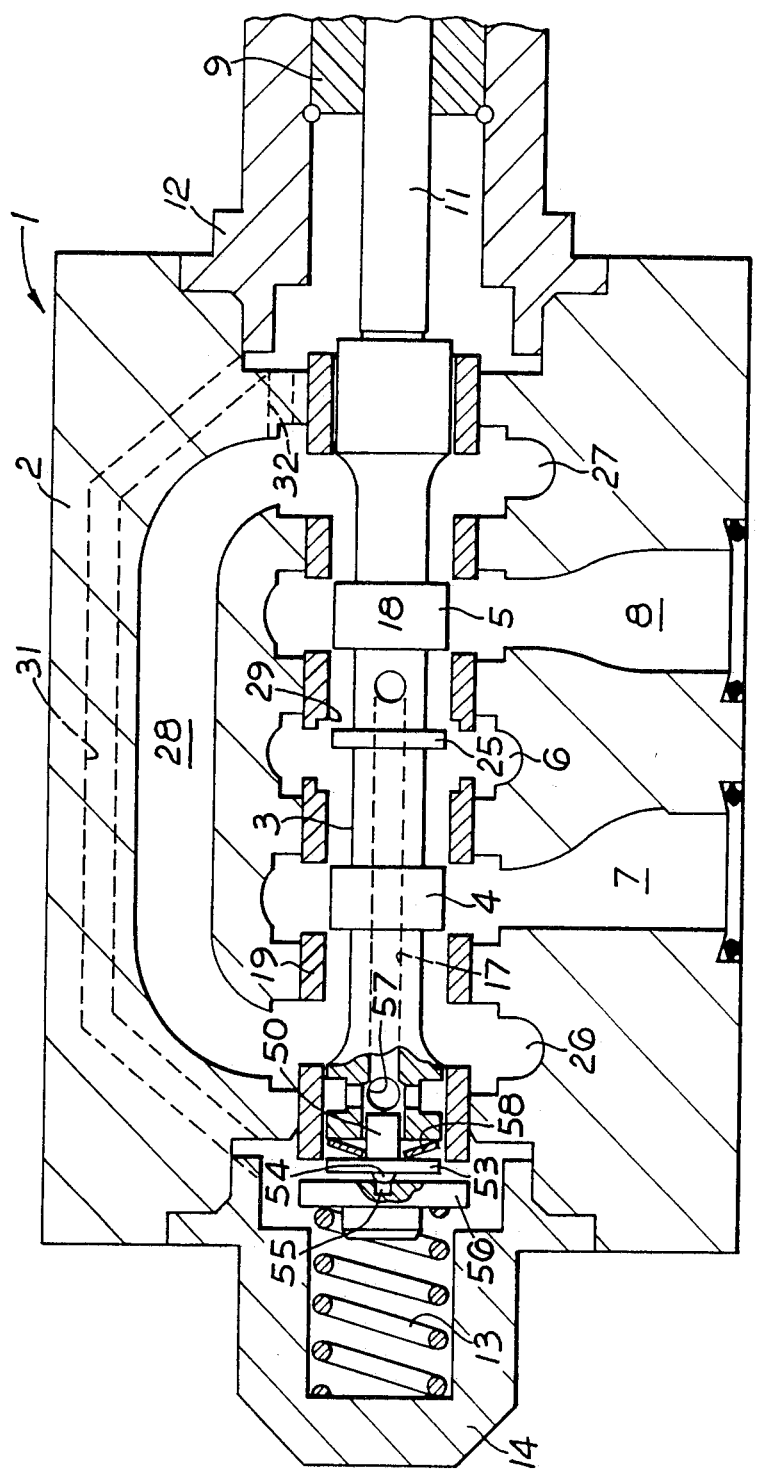

The embodiment of FIG. 5 is identical to that of FIG. 4, the only difference being the provision of a spring washer 58 between the head 56 of the poppet valve 50 and the end face of the spool 3. The spring washer 58 assists in the movement of the spool 3 to the offset position and thus increases the dynamic response. It should be noted that such a spring washer may be used in the embodiments of FIGS. 1 and 3.

Figure 6:
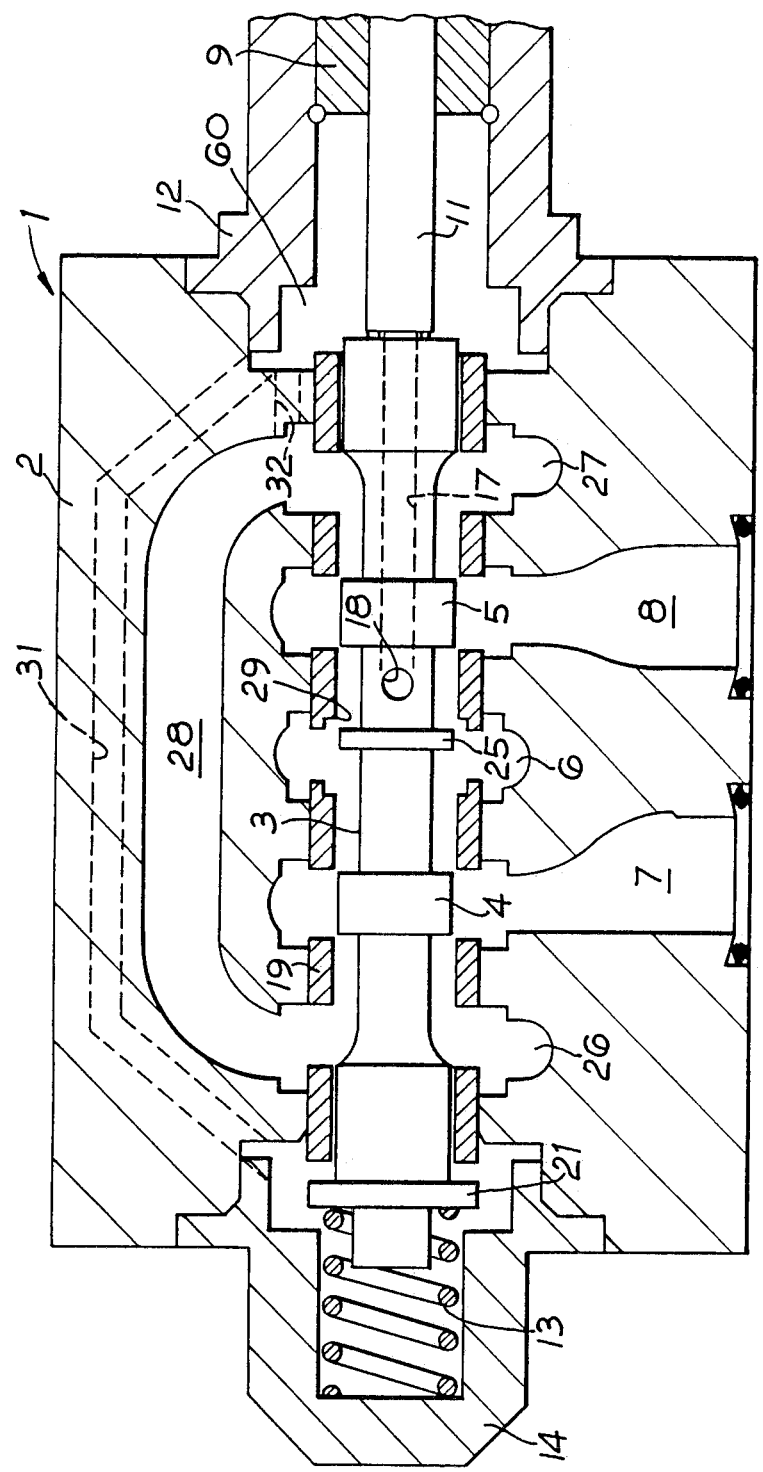

Turning now to FIG. 6, the valve of this embodiment is also generally similar to that of FIG. 1 and like components have been given similar reference numerals, as with other embodiments. The main difference between these two embodiments is that the poppet valve member 15 has been dispensed with and the passageway 17, 18 now extends to the opposite end of the spool 3 with the solenoid push pin 11 serving normally to maintain the passageway closed against flow of fluid therethrough. The spring 13 at the left-hand end of the spool 3 acts on the end of the spool via the flanged member 21.

In the event of an electrical failure, no force is exerted by the solenoid push pin 11 on the spool 3, whereby the latter is moved to the right by the spring 13, as before. When the spring is rendered inoperative by the engagement of the flange 21 with the sleeve 19, fluid in the passageway 17, 18 is able to lift the push pin 11 from sealing engagement with the end of the passageway portion 17 and fluid thus enters the end chamber 60 of the valve and flows to tank via the internal drilling 32. In this manner, both of the service ports 7 and 8 are connected to tank, whereby the main stage can centralise. For convenience, the main stage shown in FIG. 1 has been omitted from FIGS. 2 to 6.

It will be seen that the provision of the additional land 25 overcomes the disadvantage discussed above in relation to U.S. Pat. No. 4,615,358. This additional land is arranged such that when the spool 3 is beyond a specific offset position it inhibits fluid flow from the pressure port 6 to one or both service ports 7, 8. As has been described, when the spool 3 is in a normal offset position, the metering lands 4 and 5 connect only one service port 7, 8 to the pressure port 6 and the other service port to the tank ports 26, 27. Thus, when in the failsafe condition, the additional land 25 need only inhibit flow to the one service port 8 which would be connected to the pressure port 6 and the net result is that neither service port receives flow from the pressure port and continuous fluid flow from the pressure port is inhibited in this offset position. To reach this position when the or each solenoid or other device is or are de-energised, a bias in the centring springs needs to be introduced, such as by the spring 13 in the illustrated embodiments.

This change in spring bias ensures that the metering area between one service port 7, 8 and the tank ports 26, 27 is large and means of venting this to tank pressure is not required. Thus only one drilling through the spool 3 need be provided and may be directed to either end of the spool, also resulting in only one nozzle or closing device being required thus reducing potential of leakage during normal operation.

If, by design, the offset spring force is great enough, a second solenoid or other control device, which would normally assist this spring force, can be eliminated (as in the illustrated embodiments) with a useful cost saving. Furthermore, such an offset spring force could be generated by just one spring giving another small saving.

It will be seen that the internal passageway may extend to either end of the pilot spool, with closure means being operable to close the same. The closure means may be in any form which is normally urged to the closed position by the force between the solenoid or other central device and spool or between spool and resilient means. The closure means open when the solenoid or other control device force falls below a predefined limit which would normally by design be below the preload in the resilient means when the latter is in contact with the stop means. The force to open the closure means may come from additional resilient means or utilise the fluid pressure in the blocked control chamber which is connected to the closure means by the internal passageway in the spool. The additional resilient means may be in the form of a spring which operates to urge a valve (such as a ball valve) to the open position, this valve normally being maintained closed by the solenoid push pin, for example.

In the zero flow position, one main spool control chamber is connected to tank by means of the normal metering lands 4, 5 on the pilot spool 3, while the other control chamber cannot communicate with either tank or pressure and is in a blocked condition by reason of metering means 25 on the pilot spool.

If to null the spool 34 of the second or main stage requires fluid to flow out of this blocked control, then there will be a pressure within the blocked control chamber generated by springs which are arranged to urge the spool of the main stage into its null condition.

The fluid flow from the blocked main valve control chamber occurs as a result of the fluid pressure in that control chamber and the differential movement between the closure means and the pilot spool.

It will be seen that the present invention overcomes the problems of the prior art in a simple, cost-effective manner. It also ensures that in the event of spring failure the fail-safe function will still operate.

I claim:

1. A method of controlling a pilot valve for a two-stage hydraulic device, the pilot valve comprising a housing, an inlet port and two service ports provided in said housing, a spool slidably mounted in said housing, first and second metering means provided on said spool, said spool being movable in opposite directions from a normal null position in order to deliver, under the control of said first or second metering means, fluid under pressure from said inlet port through one of said two service ports to the second stage of the device to actuate the latter in one of said opposite directions from a normal null position, and an electrically-actuated spool control device, associated with one end of said spool, said pilot valve spool being movable beyond its normal operating range to an offset zero flow position in the event of a failure of said control device, wherein the improvement comprises the steps of:
    (a) providing the pilot valve spool with third metering means,
    (b) providing resilient means disposed at one end of said pilot valve spool and operable, in the event of said failure, to move said spool to a predetermined position,
    (c) providing stop means for said resilient means operable to prevent further movement of said spool by said resilient means beyond said predetermined position,
    (d) allowing pressure fluid to react on said pilot valve spool so that when said resilient means engages said stop means, this reaction results in further movement of said spool to move said spool fully to the offset zero flow position in which both said service ports are connected to tank,
    (e) and arranging for said third metering means to inhibit flow of fluid under pressure from said inlet port through the service port which would otherwise be subjected to such flow in such offset position of said pilot spool.

2. A method according to claim 1, wherein the pressure fluid serving to complete the movement of the spool to the offset position is the pressure fluid in the second stage of the valve.

3. A method according to claim 1, wherein the pressure fluid serving to complete the movement of the spool to the offset position is provided by a supply external to the valve.

4. A method according to claim 1, wherein the pressure fluid serving to complete the movement of the spool in the offset position is provided by the normal supply pressure which, in use, is connected to the hydraulic device.

* * * * *